(12) United States Patent
Beuschel et al.

(10) Patent No.: US 10,808,853 B2
(45) Date of Patent: Oct. 20, 2020

(54) PNEUMATIC VALVE

(71) Applicant: Conti Temic Microelectronic GmbH, Nuremberg (DE)

(72) Inventors: Michael Beuschel, Stammham (DE); Stefan Bauer, Engelbrechtsmünster (DE); Markus Ziegelmeier, Buxheim (DE)

(73) Assignee: Conti Temic Microelectronic GmbH (DE)

( * ) Notice: Subject to any disclaimer, the term of this patent is extended or adjusted under 35 U.S.C. 154(b) by 116 days.

(21) Appl. No.: 16/047,161

(22) Filed: Jul. 27, 2018

(65) Prior Publication Data
US 2019/0049028 A1 Feb. 14, 2019

(30) Foreign Application Priority Data
Aug. 8, 2017 (DE) .......................... 10 2017 213 736

(51) Int. Cl.
*F16K 15/20* (2006.01)
*F16K 15/18* (2006.01)
(Continued)

(52) U.S. Cl.
CPC ............ *F16K 15/207* (2013.01); *F16K 15/18* (2013.01); *F16K 15/183* (2013.01); *F16K 31/00* (2013.01);
(Continued)

(58) Field of Classification Search
CPC ...... F16K 15/063; F16K 15/18; F16K 15/183; F16K 15/207; F16K 31/0606; F16K 31/0624; F16K 31/0627
See application file for complete search history.

(56) References Cited

U.S. PATENT DOCUMENTS 1,679,898 A  *  8/1928  Gilbert ................... F16K 15/063
                                                      137/243.2
3,791,408 A  *  2/1974  Saitou ...................... F16K 17/04
                                                      137/529
(Continued)

FOREIGN PATENT DOCUMENTS

CN         102161321 A       8/2011
CN         105579751 A       5/2016
(Continued)

OTHER PUBLICATIONS

German Search Report for German Application No. 10 2017 213 736.3, dated Jun. 12, 2018, with partial translation—8 pages.
(Continued)

*Primary Examiner* — Seth W. Mackay-Smith
(74) *Attorney, Agent, or Firm* — RatnerPrestia

(57) ABSTRACT

A pneumatic valve, includes an air chamber, a connector for supplying compressed air to the air chamber and one or more connectors for discharging compressed air from the air chamber. The valve includes an actuator with a mobile closure element which, when the actuator is activated, blocks the supply of compressed air via the supply connector, and when the actuator is deactivated, is arranged to permit the supply of compressed air via the supply connector. The actuator is configured such that the closure element, on deactivation of the actuator, is moved by a restoring force into the free position. A check valve with a spring is arranged at the supply connector. The elastic force of the spring in the free position of the closure element prevents back-flow of compressed air from the air chamber into the supply connector when there is no supply of compressed air at the supply connector.

15 Claims, 5 Drawing Sheets

(51) Int. Cl.
*F16K 31/06* (2006.01)
*F16K 31/00* (2006.01)

(52) U.S. Cl.
CPC .......... *F16K 31/06* (2013.01); *F16K 31/0606* (2013.01); *F16K 31/0624* (2013.01); *F16K 31/0627* (2013.01); *F16K 31/0631* (2013.01); *F16K 31/0675* (2013.01)

(56) References Cited

U.S. PATENT DOCUMENTS

| | | | |
|---|---|---|---|
| 4,467,426 A | 8/1984 | Hida et al. | |
| 4,516,788 A | 5/1985 | Umetsu et al. | |
| 4,548,233 A * | 10/1985 | Wolfges | F16K 17/06 |
| | | | 137/529 |
| 4,631,923 A * | 12/1986 | Smith | F16K 15/18 |
| | | | 137/522 |
| 5,050,840 A * | 9/1991 | Kondo | H01F 7/1607 |
| | | | 251/129.08 |
| 5,382,933 A | 1/1995 | Nakamura et al. | |
| 6,026,860 A * | 2/2000 | Teichmann | F16K 31/06 |
| | | | 137/870 |
| 6,084,493 A | 7/2000 | Siegel | |
| 6,206,044 B1 | 3/2001 | Gluf | |
| 6,209,563 B1 * | 4/2001 | Seid | F15B 13/0405 |
| | | | 137/15.21 |
| 6,851,350 B2 | 2/2005 | Lissel et al. | |
| 7,036,527 B2 * | 5/2006 | Ezaki | F16K 31/423 |
| | | | 137/881 |
| 7,730,906 B2 * | 6/2010 | Kleinert | H01F 7/1607 |
| | | | 137/625.26 |
| 8,794,707 B2 | 8/2014 | Bocsanyi et al. | |
| 8,794,718 B2 * | 8/2014 | Bensch | B60T 8/362 |
| | | | 137/596.1 |
| 8,807,519 B2 * | 8/2014 | Bruck | F16K 31/0655 |
| | | | 251/129.19 |
| 9,784,374 B2 * | 10/2017 | Ikeda | F16K 31/408 |
| 10,011,253 B2 * | 7/2018 | Knoke | B60T 8/3675 |
| 2003/0172805 A1 | 9/2003 | Lissel et al. | |
| 2004/0035472 A1 * | 2/2004 | Teltscher | F16K 31/0606 |
| | | | 137/596.17 |
| 2009/0018474 A1 * | 1/2009 | Nakao | A61H 9/0078 |
| | | | 601/149 |
| 2013/0287608 A1 * | 10/2013 | Elliott | F04B 49/00 |
| | | | 417/435 |
| 2014/0230921 A1 | 8/2014 | Bocsanyi | |
| 2017/0067571 A1 * | 3/2017 | Burger | B60T 15/027 |
| 2017/0089483 A1 * | 3/2017 | Aihara | F16K 31/0606 |
| 2017/0146148 A1 * | 5/2017 | Kim | F16K 31/0658 |
| 2017/0146150 A1 * | 5/2017 | Tuskes | F16K 31/082 |
| 2017/0328311 A1 * | 11/2017 | Franklin | B60K 15/03519 |
| 2018/0355994 A1 * | 12/2018 | Hutchins | F15B 13/0405 |

FOREIGN PATENT DOCUMENTS

| | | |
|---|---|---|
| DE | 4235822 A1 | 4/1993 |
| DE | 19710353 A1 | 9/1998 |
| DE | 10210877 A1 | 11/2003 |
| DE | 102013220557 A1 | 4/2015 |
| DE | 102013220563 A1 | 4/2015 |
| EP | 2361800 A1 | 8/2011 |
| JP | H07243542 A | 9/1995 |
| KR | 20090117292 A | 11/2009 |

OTHER PUBLICATIONS

Chinese Office Action for Chinese Application No. 201810836784. X, dated Aug. 7, 2019, with translation, 10 pages.

* cited by examiner

PNEUMATIC VALVE

CROSS REFERENCE TO RELATED APPLICATION

This application claims priority to German Patent Application No. 10 2017 213 736.3, filed Aug. 8, 2017, the contents of such application being incorporated by reference herein.

FIELD OF THE INVENTION

The invention relates to a pneumatic valve and to a device for the pneumatic adjustment of a seat, which comprises one or more pneumatic valves.

BACKGROUND OF THE INVENTION

Pneumatic valves are used for controlling air flows in a multiplicity of technical fields of application. For example, pneumatic valves are used in means of transportation for seat adjustment. In that context, the valves are used to control the filling of elastic air bladders for shaping seat contours.

Various approaches for reducing both the installation space and the production costs of pneumatic valves are known from the prior art.

Document DE 10 2013 220 557 A1, incorporated by reference herein, describes an electromagnetic valve arrangement having at least one valve, wherein a compact installation space of the valve can be achieved by arranging a longitudinal axis of the coil of an electromagnetic actuating element and a longitudinal axis of the valve at right angles to one another.

Document EP 2 361 800 B1, incorporated by reference herein, describes a pneumatic adjustment device for a seat, having a valve arrangement, wherein a fluid pressure source and the valve arrangement are arranged in a common housing. The valve arrangement of this document further shows 3/2-way switching valves with check valves connected upstream. In that context, the switching valves and check valves are self-contained components which are connected to one another by additional connection parts.

SUMMARY OF THE INVENTION

An aspect of the invention is a pneumatic valve with an actuator and integrated check valve, which is of compact construction and can be produced in a cost-effective manner.

The pneumatic valve according to an aspect of the invention comprises an air chamber having a supply connector for supplying compressed air to the air chamber and one or more discharge connectors for discharging compressed air from the air chamber. Also, there is provided in the valve an actuator with a mobile closure element which, when the actuator is activated (i.e. when electrical energy or current is supplied to the actuator), is arranged in a blocking position in which the supply of compressed air via the supply connector is blocked, and which closure element, when the actuator is deactivated (i.e. when there is no supply of electrical energy or current), is arranged in a free position in which the supply of compressed air via the supply connector is permitted.

The actuator of the pneumatic valve according to an aspect of the invention is configured such that the closure element, on deactivation of the actuator, is moved by means of a restoring force into the free position. There is also arranged, at the supply connector, a check valve with an elastic means, wherein the elastic force of the elastic means in the free position of the closure element prevents back-flow of compressed air from the air chamber into the feed air connector when there is no supply of compressed air at the supply connector. Preferably, in this valve the pressure exerted by the actuator on the supply connector in the blocking position is greater, and in particular markedly greater, than the pressure exerted in the free position by the check valve, which corresponds to the opening pressure of the check valve.

The pneumatic valve according to an aspect of the invention is characterized in that the restoring force for moving the closure element into the free position is generated by the elastic means of the check valve. In other words, the elastic means performs a dual role in that it generates both the restoring force of the actuator and the elastic force of the check valve. This ensures a compact construction with low costs since only a single elastic means is required for two functions.

In one particularly preferred embodiment, the valve according to an aspect of the invention comprises a first and a second discharge connector, wherein, in the free position of the closure element when there is a supply of compressed air, the compressed air is allowed to flow through from the supply connector to the first discharge connector, and at the same time the second discharge connector is blocked. By contrast, in the blocking position of the closure element, a connection is established between the first discharge connector and the second discharge connector via the air chamber. Preferably, in that context the first discharge connector represents a discharge connector to a pneumatic consumer such as an air bladder. By contrast, the second discharge connector is preferably a venting connector. This variant of an aspect of the invention permits a simple design for a 3/2-way switching valve.

In another variant, the elastic means provided in the valve according to an aspect of the invention is a spring and in particular a helical spring.

Moreover, in another advantageous variant, at least one part of the elastic means is guided in at least one bore in the closure element, thus achieving a stable construction of the valve.

In another embodiment, the valve according to an aspect of the invention is a solenoid valve with an electromagnetic actuator, in which a closure element in the form of an armature can be moved by energizing.

In another configuration of an aspect of the invention, the check valve comprises a separate closure component which is different from the closure element and on which the elastic force of the elastic means acts in order, in the free position of the closure element, to prevent a back-flow of compressed air from the air chamber into the supply connector when there is no supply of compressed air at the supply connector. This separate closure component does not carry out the movement of the closure element between the blocking position and the free position.

In a variant of the embodiment just described, two separate sealing seats for the closure element and the check valve are provided at the supply connector, wherein in the blocking position a sealing face of the closure element is pressed onto the sealing seat for the closure element, and wherein in the free position the separate closure component, when there is no supply of compressed air at the supply connector, is pressed onto the sealing seat for the check valve by the elastic force of the elastic means.

In an alternative configuration of the above valve with separate closure component, a single sealing seat is provided, wherein in the blocking position the closure element exerts, via the elastic means, a force on the separate closure component in order to thus press the separate closure component onto the single sealing seat and block the supply connector, and wherein in the free position the separate closure component, when there is no supply of compressed air at the supply connector, is pressed onto the single sealing seat by the elastic force of the elastic means. With this variant, it is possible to achieve a compact construction of the valve by using just one sealing seat both for the blocking position of the valve and also for the function of the check valve.

In another variant, the elastic means is arranged between a first stop on the closure element and a second stop on the separate closure component, and thus achieving a simple transfer of the force of the elastic means both to the closure element and to the closure component.

In another configuration, the separate closure component is spherical or conical at that end facing the supply connector, thus achieving efficient sealing.

In an advantageous refinement, the separate closure component has a continuation which extends away from the supply connector and against which the closure element presses in the blocking position in order to block the supply of compressed air via the supply connector. The continuation can for example be configured as a pin or a rod. Preferably, the continuation is guided at least in part in a bore of the closure element. Alternatively or additionally, the continuation extends at least in part through the elastic means. This makes it possible to ensure stable guiding of the continuation or of the elastic means.

In another embodiment, a single sealing seat is provided at the supply connector, and at least part of the closure element of the actuator represents a closure component of the check valve, that is to say that the closure component belongs to the closure element and can be moved therewith. In that context, in the blocking position a sealing face of the closure component presses against the single sealing seat. Equally, in the free position the sealing face of the closure component presses against the single sealing seat when there is no supply of compressed air at the supply connector. This variant of an aspect of the invention achieves a space-saving construction by integrating the closure component into the closure element.

In a preferred variant of the embodiment just described, the closure element comprises a first part and, separate therefrom, a second part, between which the elastic means is arranged, wherein the second part forms the closure component of the check valve.

In addition to the valve described above, an aspect of the invention relates to a device for the pneumatic adjustment of a seat in a means of transport, wherein the device comprises multiple air bladders the filling and emptying of which adjusts the seat. Each air bladder is assigned a separately switchable valve according to an aspect of the invention, wherein all of the valves are connected via their respective supply connector to a common compressed air supply, and each air bladder is connected to a discharge connector of its associated valve.

In a particularly preferred embodiment, the above pneumatic seat adjustment system is combined with the above-described variant of the valve according to an aspect of the invention, which comprises a first and a second discharge connector. In that context, the first discharge connector is a working connector to which a respective air bladder is connected for filling with compressed air from the compressed air supply. Conversely, the second discharge connector is a venting connector for venting the respective air bladder. In this seat adjustment system, and when the valves are configured appropriately, a portion of the valves can be switched to the blocking position (i.e. the venting position) while another portion of the valves is filled.

In a preferred variant of the embodiment just described, the actuator of each valve is configured such that, in the blocking position of the closure element, the actuator exerts on the supply connector a pressure which is elevated, by the maximum permissible filling pressure of the air bladders, in comparison to the pressure on the supply connector which the check valve exerts on the supply connector in the free position of the closure element when there is no supply of compressed air at the supply connector. In a switching position in which a portion of the air bladders is being filled and at least one air bladder is being vented, it is possible, with this variant, by means of the valve of the air bladder being vented, to achieve an overpressure valve or a pressure-limiting valve. Specifically, if the filling pressure of the air bladders exceeds the maximum permitted filling pressure, the valve of the air bladder being vented switches to the free position and thus prevents the air bladders currently being filled from bursting.

BRIEF DESCRIPTION OF THE DRAWINGS

Exemplary embodiments of aspects of the invention will be described in detail below on the basis of the appended figures.

In the drawings.

DETAILED DESCRIPTION OF THE PREFERRED EMBODIMENTS

There follows an explanation of an aspect of the invention with reference to a pneumatic valve which is used in a device for the pneumatic adjustment of a seat in a motor vehicle by means of air bladders. Nevertheless, the valve according to an aspect of the invention can also be used in any other pneumatic application.

Figure 1:
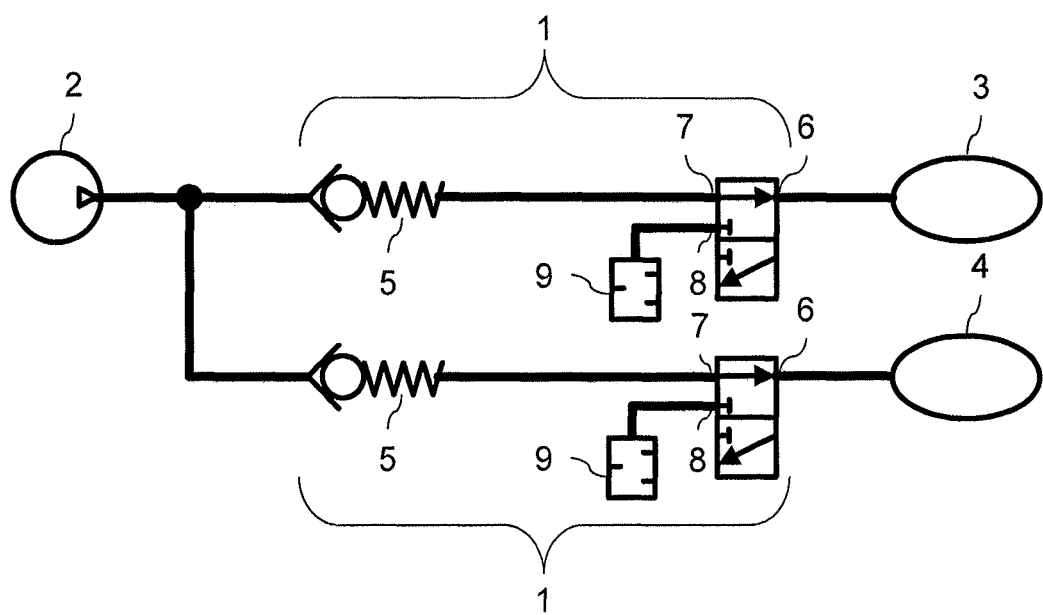
FIG. 1 shows a connection diagram of a pneumatic seat adjustment system which uses the valves according to an aspect of the invention.

FIG. 1 shows a connection diagram of a corresponding pneumatic seat adjustment system of a motor vehicle seat. The pneumatic seat adjustment system contains a compressed air supply 2 in the form of a compressor which is connected, via compressed air lines and interposed valves 1, to two air bladders 3 and 4. In that context, the air bladders are integrated into the motor vehicle seat and serve for example as lumbar supports. Each valve 1 comprises a check valve 5 and a further 3/2-way valve with a feed air connector 6, a working connector 7 leading to the air bladder, and a venting connector 8. In that context, a damper 9 is integrated into the venting connector. Although the pneumatic setup shown in FIG. 1 is known per se, the functionalities of the check valve and of the 3/2-way valve are now integrated in a special manner into a single pneumatic valve 1, as explained in greater detail below.

In the pneumatic seat adjustment system of FIG. 1, the two 3/2-way valves can be switched separately from one another. In the blocking position of the respective 3/2-way valve, in which the air bladder 3 or 4 is vented, this valve serves to exert a pressure on the feed air connector 6 that is higher than the pressure that the check valve 5 exerts against the compressed air of the compressed air supply 2 when the 3/2-way valve is in the free position, that is to say when the feed air connector 6 is connected to the working connector 7.

The consequence of this choice of pressures is that an air bladder can be filled while the other air bladder is vented. To that end, the 3/2-way valve of the air bladder that is to be filled is switched to the free position, resulting in compressed air being supplied to the air bladder by overcoming the closing force of the check valve. By contrast, the 3/2-way valve of the air bladder to be vented is in the blocking position, which is characterized in that the compressed air of the compressed air supply cannot open the 3/2-way valve unless a predefined maximum filling pressure is exceeded. Accordingly, the venting procedure of the corresponding air bladder can take place in parallel with the filling procedure of the other air bladder.

There follows an explanation of various variants of a pneumatic valve 1 according to an aspect of the invention, which can be used in the seat adjustment system of FIG. 1. In that context, all of the variants share the fact that the function of the 3/2-way valve in the switching arrangement of FIG. 1 is achieved by using an electromagnetic actuator, that is to say that the valves are solenoid valves.

Figure 2:
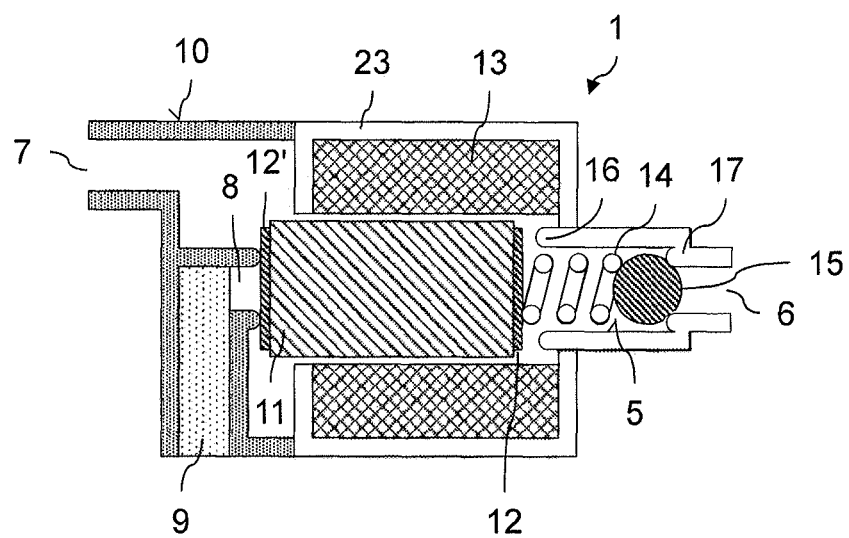
FIGS. 2 to 4 show section views of a first embodiment of the valve according to an aspect of the invention, in different switching positions.
Figure 3:
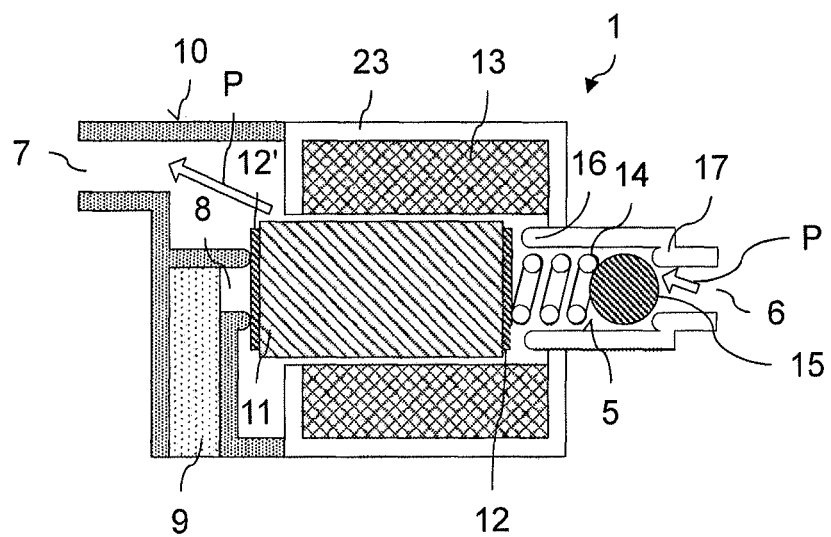
Figure 4:
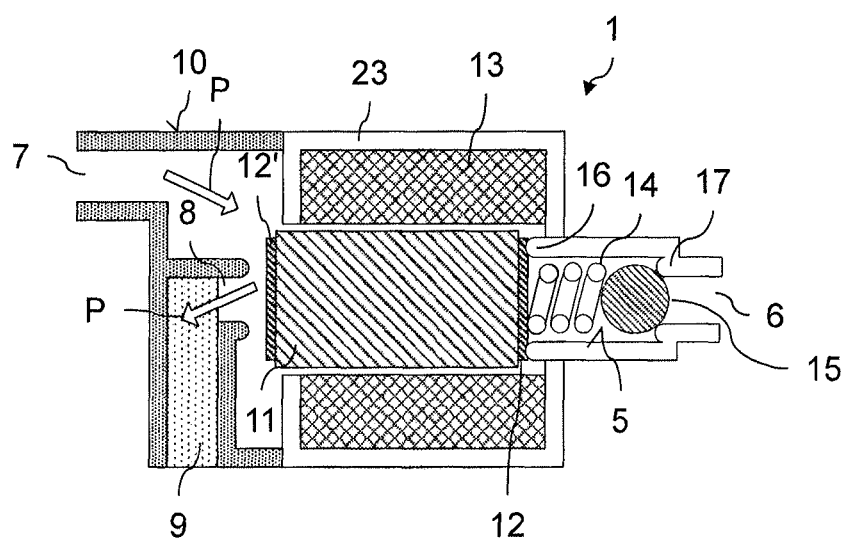

According to the embodiment of FIG. 2 to FIG. 4, the pneumatic valve 1 comprises an airtight housing 10 which forms an air chamber, wherein the outer face of a yoke 23 forms part of the housing. The electromagnetic actuator, comprising an armature 11 which is made of magnetic material and which is mobile in a horizontal direction, is located in the housing. In order to move the armature, there is arranged around the latter a coil 13 which is in turn surrounded by the above-mentioned yoke 23. The feed air connector 6, which is connected to the compressed air supply 2 of FIG. 1, is provided in the valve housing 10. Furthermore, the housing contains the working connector 7 which leads to a corresponding air bladder 3 or 4, and also contains the venting connector 8 in which is located the damper 9.

In the exemplary embodiment of FIG. 1, the check valve 5 consists of a ball 15 and a helical spring 14, wherein the spring force of the helical spring 14 presses the ball 15 against a sealing seat 17 provided in the feed air connector 6. In addition to this sealing seat 17, the feed air connector comprises the further sealing seat 16. This sealing seat interacts with a sealing pad 12 which is formed on the right side of the armature 11 and, in the blocking position of the valve, presses against the sealing seat 16. Furthermore, the further sealing pad 12' is provided on the opposite side of the armature 11 and, in the free position of the armature or of the actuator, presses against a sealing seat of the venting connector 8 and thus blocks this connector.

The embodiment of FIG. 2 to FIG. 4, and also all of the other embodiments explained below, are characterized in that the spring 14 of the check valve 5 also takes on the function of generating a restoring force for the armature 11 in order to move the latter from the blocking position to the free position, as will be explained in greater detail below.

FIG. 2 shows the free position of the valve 1. In this position, no current is supplied to the coil 13, and as a result the spring 14 presses the armature 11 against the venting connector 8. In this position, the sealing pad 12 is lifted off the sealing seat 16 of the feed air connector 6 so that compressed air, by overcoming the closing force of the check valve 5, can flow through the feed air connector 6, the working connector 7 and the line connected thereto, and into the corresponding air bladder. This is made clear by FIG. 3. This figure shows, by analogy with FIG. 2, the free position of the valve, but now indicates the throughflow of the compressed air by means of a corresponding arrow P. As can be seen, the compressed air opens the check valve 5 by overcoming the force generated by the spring 14.

In order to switch the valve from the free position shown in FIG. 2 to the blocking position, current is supplied to the coil 13. This generates an attraction force on the armature 11, which pulls the armature to the right, against the force of the spring 14, until the armature bears with its sealing pad 12 against the sealing seat 16 of the feed air connector 6. This blocking position is illustrated in FIG. 4. As can be seen, the feed air connector 6 is now closed, whereas, owing to the movement of the armature 11 to the right, the venting connector 8 is open.

Consequently, the air bladder connected to the working connector 7 can be vented via the venting connector 8, as indicated by the corresponding arrow P in FIG. 4.

If the blocking position of the valve is ended by interrupting the supply of current to the coil 13, the spring 14 pushes the armature 11 back into the free position. Accordingly, the spring adopts, in addition to its function of generating a closing force of the check valve, also the function of generating a restoring force for the armature. Using the spring for two different functions of the valve makes it possible to achieve a compact and cost-effective construction of the valve.

Figure 5:
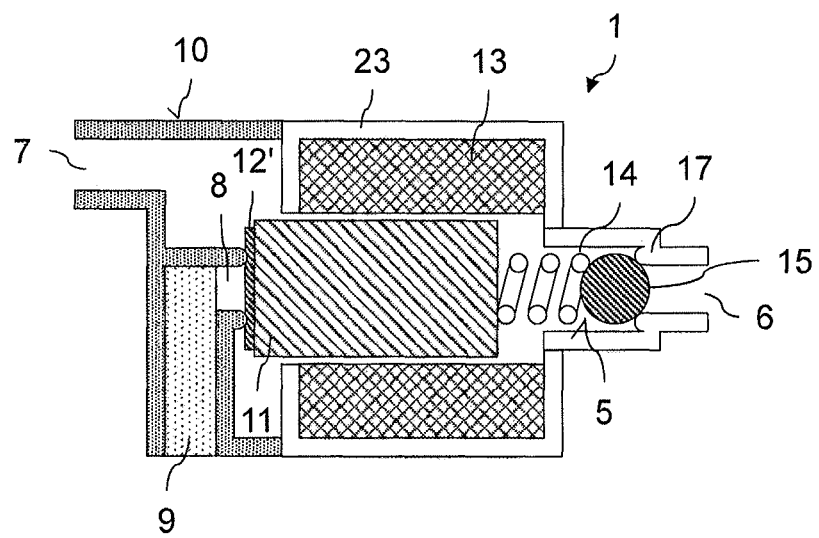
FIGS. 5 to 6 show section views of a second embodiment of a valve according to an aspect of the invention, in different switching positions.
Figure 6:
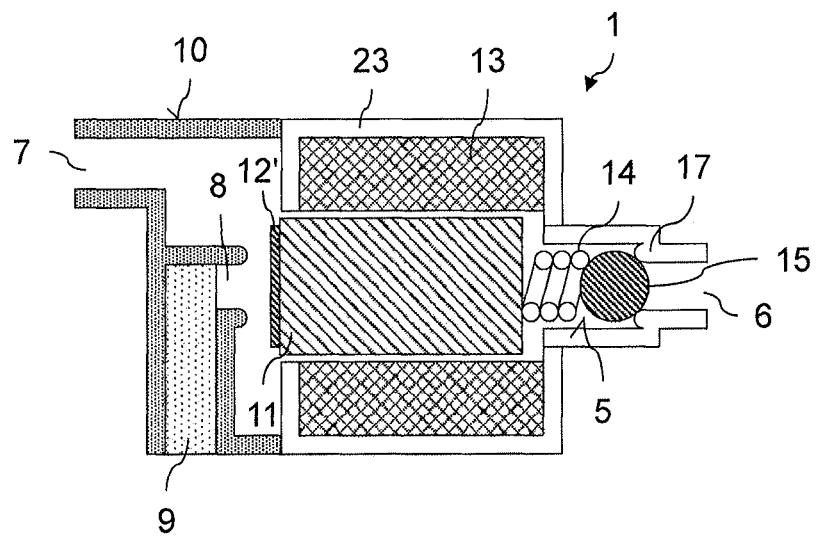

FIGS. 5 and 6 show section views of a second embodiment of a valve according to an aspect of the invention. In these figures, and also in the figures of the further embodiments, identical components are denoted with identical reference signs, and the detailed explanation of the functions of such components will not be repeated. FIG. 5 again shows the free position of the valve 1. The valve of FIG. 5 differs from the valve of FIG. 2 essentially in that the sealing seat 16 on the feed air connector 6 is omitted and only the sealing seat 17 is present, which forms both the sealing seat for the check valve 5 and also the sealing seat for establishing the blocking position of the electromagnetic actuator. Owing to the lack of a sealing seat 16, in the embodiment of FIG. 5, it is no longer necessary for a sealing pad 12 to be formed on the right-hand side of the armature 11. Accordingly, this sealing pad is omitted and the armature is in direct contact with the spring 14.

In the free position of FIG. 5, there is once more no supply of current to the coil. In that context, the spring 14 presses the left-hand sealing pad 12' of the armature 11 against the venting connector 8. When there is a supply of compressed air, and when the closing force of the check valve is overcome, a compressed air path from the connected compressed air supply via the valve 1 to the air bladder is once again established.

FIG. 6 shows the blocking position of the valve of FIG. 5. In order to adopt the blocking position, current is supplied to the coil 13, and thereby the armature 11 is moved to the right against the force of the spring 14, and the venting connector 8 is freed. In moving to the right, the armature 11, via the intermediary of the spring 14, presses the ball 15 of the check valve 5 against the sealing seat 17. Since the closing force of the armature is greater than that of the check valve, this reliably blocks the valve against compressed air at the feed air connector 6.

When current is no longer supplied to the coil, the spring 14 once again acts as a return spring in order to generate the corresponding restoring force so that the armature is moved back into the position shown in FIG. 5. The embodiment of FIG. 5 has the advantage, over the embodiment of FIG. 2, that the valve is of simple construction since only one sealing seat need be formed in the feed air connector, and also since it is possible to dispense with a sealing pad on one side of the armature.

Figure 7:
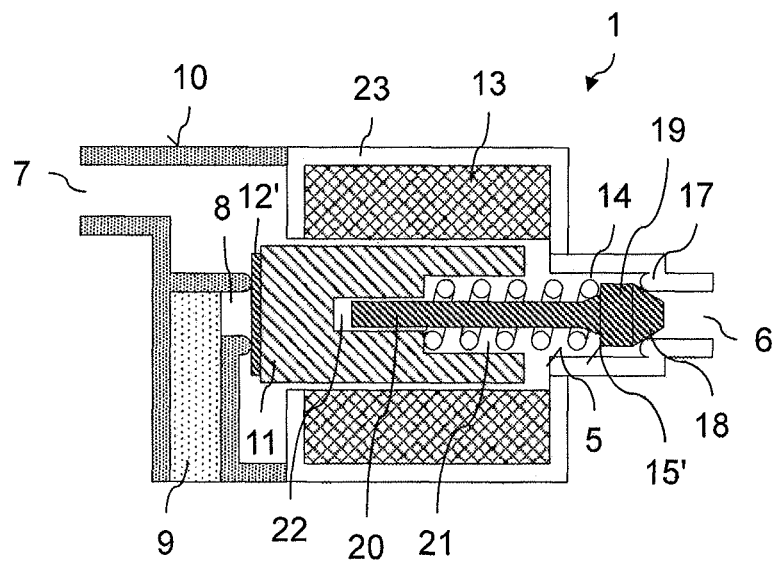
FIGS. 7 and 8 show section views of a third embodiment of a valve according to an aspect of the invention, in different switching positions.
Figure 8:
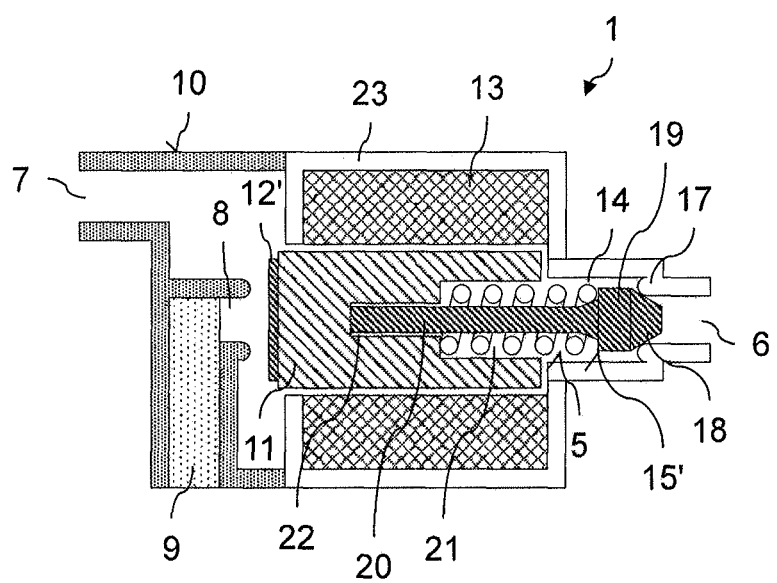

FIGS. 7 and 8 show a third embodiment of a valve according to an aspect of the invention. This embodiment differs from the other embodiments in particular in that a tappet 15' is used instead of a ball 15 as the closure component of the check valve. The sealing face of the tappet consists of a conical or tapered section 18 at the right-hand end of the tappet 15'. A cylindrical section 19 adjoins this section. In turn, a continuation in the form of a guide pin 20 extends from this cylindrical section.

As with the ball 15 of the other embodiments, the tappet 15' is preferably made as an injection-molded plastic part. In that context, it is advantageous that the tappet has a frustoconical sealing face since this allows the parting plane of the associated injection-molding tool to be arranged outside the sealing line, thus making it possible to achieve an improved seal at the sealing seat 17.

In contrast to the other embodiments, in the armature 11 of FIG. 7, at its right-hand side, there are also two bores 21 and 22. In that context, bore 21 has a larger diameter than bore 22. Bore 21 receives part of the spring 14. In that context, the continuation 20 extends through the interior of the spring 14, the left-hand section of the continuation extending into the smaller-diameter opening 22. This achieves exact guiding of the spring and of the tappet. This makes it possible to establish flatter characteristic lines of the spring 14 and/or more precise spring forces, and avoids canting of the tappet and an associated unsatisfactory seal at the sealing seat.

Both the ball 15 of the other embodiments and the tappet 15' of the embodiment of FIG. 7 are preferably made throughout from a uniform elastic material. Nevertheless, when using the tappet 15', it is also possible for the frustum 18 and the cylinder 19 to consist of soft elastic material while the continuation 20 consists of a hard component. A tappet of this kind can be made as a two-component injection-molded part.

FIG. 7 again shows the free position of the valve when there is no supply of current to the actuator. In that context, the sealing pad 12' of the armature 11 presses against the venting connector 8. Also, the frustum 18 of the tappet 15' bears against the sealing seat 17 as long as no compressed air is supplied via the feed air connector 6. When there is a supply of compressed air, the closing force of the check valve is overcome, thus moving the tappet 15' to the left and thus deeper into the opening 22. Consequently, the feed air connector is freed and the compressed air can flow from the compressed air supply into the connected air bladder.

When current is supplied to the actuator, the blocking position as shown in FIG. 8 is adopted. In that context, the armature 11 has been drawn to the right by the attraction force of the coil 13, so that the venting connector 8 is freed. Furthermore, the armature presses via the bottom of the opening 22 against the end of the continuation 20, thus achieving an increased closing force at the sealing seat 17 and thus blocking the feed air connector 6.

Figure 9:
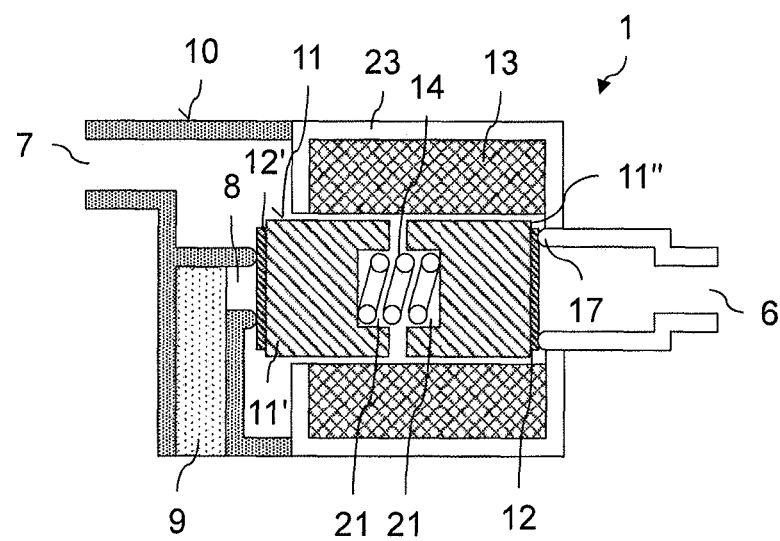
FIGS. 9 to 11 show section views of a fourth embodiment of a valve according to an aspect of the invention, in different switching positions.
Figure 10:
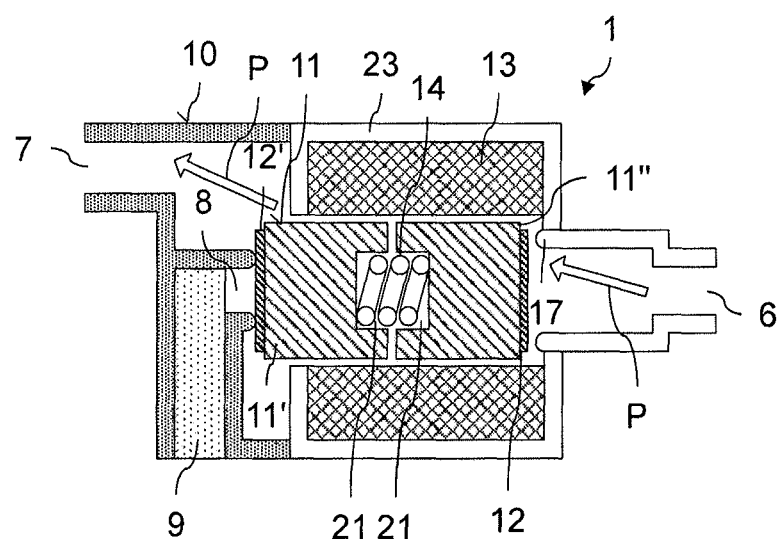
Figure 11:
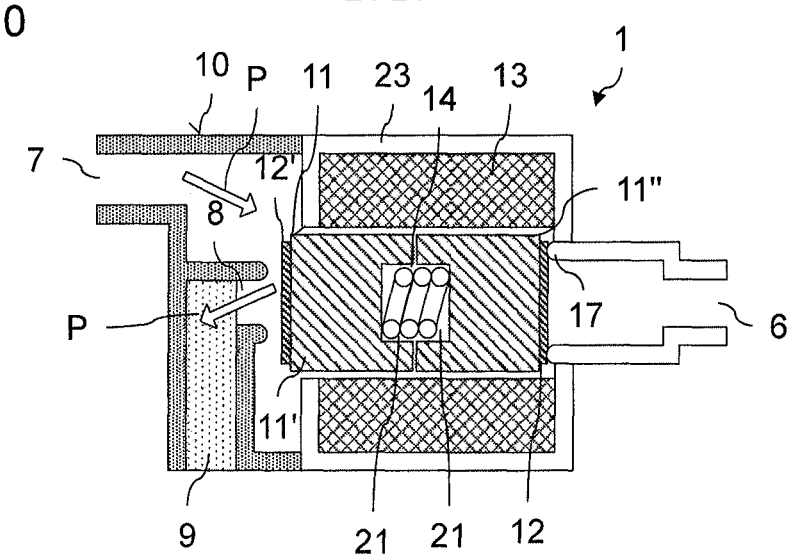

FIGS. 9 to 11 show a fourth embodiment of a valve according to an aspect of the invention. This embodiment differs from the preceding embodiments in that the closure component of the check valve, which in the other variants takes the form of a separate component 15 or 15', is now a constituent part of the armature 11. To that end, the armature 11 is split into a left-hand half 11' and a right-hand half 11". In that context, the right-hand half 11" adopts the function of the closure component of the check valve in the free position of the actuator. The spring 14 of the check valve is arranged between the two armature halves 11' and 11". To that end, two opposing cylindrical bores 21 are formed in the mutually opposite end faces of the armature halves 11' and 11".

FIG. 9 shows the free position of the valve when there is no supply of current to the coil. In that context, the spring 14 presses the left-hand armature half 11' with its sealing pad 12' against the venting connector 8. Furthermore, the spring 14 also generates the closing force of the check valve in that the spring presses the sealing pad 12 of the right-hand armature half 11" against the sealing seat 17 that is provided at the front end of the feed air connector 6. During filling of the air bladder in the free position of FIG. 9, the right-hand armature half 11" is opened by the compressed air of the compressed air supply and the air flows into the connected air bladder, as indicated in FIG. 10 by the corresponding arrow P.

In order to vent the air bladder, current is supplied to the coil 13, with the result that the magnetic force of the coil pulls the two armature halves 11' and 11" together, against the force of the spring 14, so that the air from the air bladder can escape via the venting connector 8, as represented by the arrows P in FIG. 11, which indicates the switching state when current is supplied to the coil. At the same time, by means of a suitable arrangement of the magnetic air gaps, the two armature halves 11' and 11" are drawn against the sealing seat 17 of the feed air connector 6, so that the latter is closed by the sealing pad 12. In that context, the force on the sealing seat 17 is markedly increased compared to the state when no current is supplied to the coil.

The operating principle of the valve mentioned above in FIGS. 9 to 11 is achieved by the exhaust-air-side air gap remaining essentially constant during the movement of the armature, and thus generating no force on the armature. However, the armature 11 projects beyond the yoke 23, so that there is always sufficient overlap. After supply of current to the coil, the middle air gap reduces essentially to zero and thus generates an attraction force between the two armature halves. In the resting state, the right-hand air gap is markedly smaller than the middle air gap and therefore exerts a larger force (oriented toward the right) on the right-hand armature half than the initial attraction force between the two armature halves. Thus, the right-hand armature half 11" presses its sealing face 12 against the feed air-side sealing seat 17. In that context, the embodiment of FIGS. 9 to 11 has the advantage of making it possible to achieve a particularly compact construction of the valve since the armature also takes on the function of the closure component of the check valve.

As already mentioned above, the previously described variants of the valve according to an aspect of the invention can be used in the pneumatic seat adjustment system of FIG. 1. In that context, the required opening pressure of the armature (that is to say its closing force) is markedly higher in the blocking position of the valve than the opening pressure of the check valve. In one preferred variant, the valves 1 are configured such that, when transitioning to the blocking position by supply of current to the coil, the pressure exerted by the actuator on the corresponding sealing seat of the feed air connector is increased by the maximum permitted filling pressure of the air bladders. In other words, on activation of the valve, the opening pressure of the check valve is raised by the maximum permitted filling pressure of the air bladders. This has particular advantages in the event that the seat adjustment system of FIG. 1 fills one air bladder while the other air bladder is being vented. In this case, the check valve of the air bladder being vented, which is in the blocking position, acts as an overpressure valve or a pressure-limiting valve. If, in that context, the maximum permitted filling pressure of the air bladder being filled is exceeded, this leads to the feed air connector of the valve of the other air bladder being freed, thus preventing the air bladder being filled from bursting.

As stated above, the described variants of the valve according to an aspect of the invention are used in a pneumatic arrangement that comprises two air bladders. Nevertheless, the arrangement may also contain further air bladders, with each air bladder being controlled by a corresponding valve according to an aspect of the invention. In that context, as long as at least one air bladder is vented when filling the air bladders, the above-mentioned advantage, according to which the valve of the air bladder being vented acts as an overpressure valve or a pressure-limiting valve, is achieved also in such an arrangement when the valves are configured appropriately.

The above-described embodiments of an aspect of the invention have numerous advantages. In particular, the double function of a spring for providing a restoring force for a 3/2-way valve and a closing force for a check valve makes it possible to achieve a compact construction of the valve and to reduce production costs. Furthermore, an appropriate configuration of the valves in a pneumatic seat adjustment system serves to provide suitable overpressure protection. In addition, the valve according to an aspect of the invention can be installed in a more lightweight manner than conventional switching valves, owing to its space-saving configuration.

LIST OF REFERENCE SIGNS

1 Valve
2 Compressed air supply
3, 4 Air bladders
5 Check valve
6 Feed air connector
7 Working connector
8 Venting connector
9 Damper
10 Air chamber
11 Closure element
11', 11" Parts of the closure element
12, 12' Sealing faces
13 Coil
14 Spring
15 Ball
15' Tappet
16, 17 Sealing seats
18 Frustum
19 Cylindrical section
20 Continuation
21, 22 Bores
23 Yoke

The invention claimed is:

1. A pneumatic valve, comprising:
an air chamber having a supply connector for supplying compressed air to the air chamber;
one or more discharge connectors for discharging compressed air from the air chamber;
there being provided in the pneumatic valve an actuator with a unitary closure element which, i) when the actuator is activated, is arranged in a blocking position in which the supply of compressed air via the supply connector is blocked by the unitary closure element, and ii) when the actuator is deactivated, is arranged in a free position in which the supply of compressed air via the supply connector is not blocked by the unitary closure element; and
a check valve with an elastic means arranged at the supply connector, the check valve comprising a separate closure component which is different from the unitary closure element and on which an elastic force of the elastic means acts;
wherein the elastic force of the elastic means in the free position of the unitary closure element acts on the separate closure component of the check valve to cause the separate closure component to block back-flow of compressed air from the air chamber into the supply connector when there is no supply of compressed air at the supply connector, and
wherein on deactivation of the actuator, a restoring force of the elastic means moves the unitary closure element into the free position.

2. The pneumatic valve as claimed in claim 1, wherein the pneumatic valve comprises a first and a second discharge connector, wherein, in the free position of the unitary closure element when there is a supply of compressed air, the compressed air is allowed to flow through from the supply connector to the first discharge connector, and at the same time the second discharge connector is blocked, and wherein, in the blocking position of the unitary closure element, a connection is established between the first discharge connector and the second discharge connector via the air chamber.

3. The pneumatic valve as claimed in claim 1, wherein the elastic means is a spring.

4. The pneumatic valve as claimed in claim 3, wherein the spring is a helical spring.

5. The pneumatic valve as claimed in claim 1, wherein at least one part of the elastic means is guided in at least one bore in the unitary closure element.

6. The pneumatic valve as claimed in claim 1, wherein the pneumatic valve is a solenoid valve with an electromagnetic actuator, in which the unitary closure element in the form of an armature can be moved by energizing a coil.

7. The pneumatic valve as claimed in claim 1, wherein a single sealing seat is provided at the supply connector, wherein in the blocking position the unitary closure element exerts, via the elastic means, a force on the separate closure component in order to thus press the separate closure component onto the single sealing seat and block the supply connector, and wherein in the free position the separate closure component, when there is no supply of compressed air at the supply connector, is pressed onto the single sealing seat by the elastic force of the elastic means.

8. The pneumatic valve as claimed in claim 1, wherein the elastic means is arranged between a first stop on the unitary closure element and a second stop on the separate closure component.

9. The pneumatic valve as claimed in claim 1, wherein the separate closure component is spherical or conical at an end facing the supply connector.

10. The pneumatic valve as claimed in claim 1, wherein the separate closure component has a continuation which extends away from the supply connector and against which the unitary closure element presses in the blocking position in order to block the supply of compressed air via the supply connector.

11. The pneumatic valve as claimed in claim 10, wherein the continuation is guided at least in part in a bore of the unitary closure element or the continuation extends at least in part through the elastic means.

12. A device for the pneumatic adjustment of a seat, comprising multiple air bladders the filling and emptying of which adjusts the seat, wherein each air bladder is assigned a separately switchable pneumatic valve as claimed in claim 1, wherein all of the pneumatic valves are connected via their respective supply connector to a common compressed air supply, and each air bladder is connected to a discharge connector of its associated pneumatic valve.

13. The device as claimed in claim 12, wherein each air bladder is assigned a pneumatic valve comprising a first and a second discharge connector, wherein, in the free position of the unitary closure element when there is a supply of compressed air, the compressed air is allowed to flow through from the supply connector to the first discharge connector, and at the same time the second discharge connector is blocked, and wherein, in the blocking position of the unitary closure element, a connection is established between the first discharge connector and the second discharge connector via the air chamber, wherein the first discharge connector is a working connector to which a respective air bladder is connected for filling with compressed air from the compressed air supply, and wherein the second discharge connector is a venting connector for venting the respective air bladder.

14. The device as claimed in claim 13, wherein the actuator of each pneumatic valve is configured such that, in the blocking position of the unitary closure element, the actuator exerts on a feed air connector a pressure which is elevated, by the maximum permissible filling pressure of the air bladders, in comparison to the pressure on the feed air connector which the check valve exerts on the supply connector in the free position of the unitary closure element when there is no supply of compressed air at the supply connector.

15. A pneumatic valve, comprising:
an air chamber having a supply connector for supplying compressed air to the air chamber;
one or more discharge connectors for discharging compressed air from the air chamber;
there being provided in the pneumatic valve an actuator with a closure element which, i) when the actuator is activated, is arranged in a blocking position in which the supply of compressed air via the supply connector is blocked, and ii) when the actuator is deactivated, is arranged in a free position in which the supply of compressed air via the supply connector is permitted; and
a check valve with an elastic means arranged at the supply connector;
wherein the actuator is configured such that the closure element, on deactivation of the actuator, is moved by a restoring force into the free position,
wherein an elastic force of the elastic means in the free position of the closure element prevents back-flow of compressed air from the air chamber into the supply connector when there is no supply of compressed air at the supply connector,
wherein the restoring force for moving the closure element into the free position is generated by the elastic means of the check valve,
wherein the check valve comprises a separate closure component which is different from the closure element and on which the elastic force of the elastic means acts in order, in the free position of the closure element, to prevent a back-flow of compressed air from the air chamber into the supply connector when there is no supply of compressed air at the supply connector, and
wherein two separate sealing seats for the closure element and the check valve are provided at the supply connector, wherein in the blocking position a sealing face of the closure element is pressed onto the sealing seat for the closure element, and wherein in the free position the separate closure component, when there is no supply of compressed air at the supply connector, is pressed onto the sealing seat for the check valve by the elastic force of the elastic means.

* * * * *